US012744895B2

(12) United States Patent
Karczewicz et al.

(10) Patent No.: US 12,744,895 B2
(45) **Date of Patent: *Sep. 22, 2026**

(54) FILTERING VIDEO DATA USING A PLURALITY OF FILTERS

(71) Applicant: QUALCOMM Incorporated, San Diego, CA (US)

(72) Inventors: Marta Karczewicz, San Diego, CA (US); Wei-Jung Chien, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/299,628

(22) Filed: Apr. 12, 2023

(65) Prior Publication Data

US 2023/0247228 A1 Aug. 3, 2023

Related U.S. Application Data

(63) Continuation of application No. 16/153,652, filed on Oct. 5, 2018, now Pat. No. 11,711,548, which is a (Continued)

(51) Int. Cl.
*H04N 19/117* (2014.01)
*H04N 19/44* (2014.01)
(Continued)

(52) U.S. Cl.
CPC .......... *H04N 19/117* (2014.11); *H04N 19/44* (2014.11); *H04N 19/46* (2014.11); *H04N 19/80* (2014.11); *H04N 19/85* (2014.11)

(58) Field of Classification Search
None
See application file for complete search history.

(56) References Cited

U.S. PATENT DOCUMENTS 4,974,065 A 11/1990 Murakami et al.
5,610,729 A 3/1997 Nakajima
(Continued)

FOREIGN PATENT DOCUMENTS

CA 2547954 A1 7/2005
CN 1450811 A 10/2003
(Continued)

OTHER PUBLICATIONS

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, Document: JCTVC-L1003_v34, 12th Meeting, Geneva, CH, Jan. 14-23, 2013, entire document, 310 pages.
(Continued)

*Primary Examiner* — Mohammed Jebari
(74) *Attorney, Agent, or Firm* — Polsinelli

(57) ABSTRACT

Systems and methods of filtering video data using a plurality of filters are disclosed. In an embodiment, a method includes receiving and decoding a plurality of filters embedded in a video data bitstream at a video decoder. The method includes selecting, based on information included in the video data bitstream, a particular filter of the plurality of filters. The method further includes applying the particular filter to at least a portion of decoded video data of the video data bitstream to produce filtered decoded video data.

5 Claims, 5 Drawing Sheets

Related U.S. Application Data continuation of application No. 12/406,585, filed on Mar. 18, 2009, now Pat. No. 10,123,050.

(60) Provisional application No. 61/094,011, filed on Sep. 3, 2008, provisional application No. 61/079,998, filed on Jul. 11, 2008.

(51) Int. Cl.
*H04N 19/46* (2014.01)
*H04N 19/80* (2014.01)
*H04N 19/85* (2014.01)

(56) References Cited

U.S. PATENT DOCUMENTS 5,798,795 A 8/1998 Glenn et al.
5,802,218 A 9/1998 Brailean
5,822,467 A 10/1998 Lopez et al.
5,844,613 A 12/1998 Chaddha
5,844,627 A 12/1998 May et al.
5,930,397 A 7/1999 Tsujii et al.
5,940,536 A * 8/1999 Wake ....................... H04N 5/14 348/E5.062
6,188,799 B1 * 2/2001 Tan ....................... H04N 19/86 382/268
6,281,942 B1 8/2001 Wang et al.
6,295,382 B1 * 9/2001 Karanovic ................ G06T 5/20 358/463
6,356,592 B1 3/2002 Naito
6,370,279 B1 4/2002 Paik
6,504,872 B1 1/2003 Fimoff et al.
6,510,252 B1 1/2003 Kishimoto
6,611,295 B1 8/2003 Drouot et al.
6,748,113 B1 6/2004 Kondo et al.
6,792,152 B1 * 9/2004 Shibata ................ H04N 19/124 375/E7.193
6,983,079 B2 1/2006 Kim
7,003,038 B2 2/2006 Divakaran et al.
7,076,114 B2 7/2006 Westerman
7,203,234 B1 4/2007 Zeng
7,289,154 B2 10/2007 Gindele
7,391,812 B2 6/2008 Pun et al.
7,453,938 B2 11/2008 Haskell et al.
7,460,596 B2 12/2008 Kwon et al.
7,702,013 B2 4/2010 Schwarz et al.
7,809,207 B2 10/2010 Dumitras et al.
7,894,524 B2 2/2011 Demos
7,903,179 B2 3/2011 Morino
7,916,965 B2 3/2011 Chiu et al.
8,086,062 B2 12/2011 Lin et al.
8,194,757 B2 6/2012 Schoner
8,374,246 B2 2/2013 Raveendran et al.
8,804,833 B2 8/2014 Francois et al.
8,897,591 B2 11/2014 Wilkins et al.
8,964,852 B2 2/2015 Chong et al.
8,964,853 B2 2/2015 Chong et al.
8,982,960 B2 3/2015 Chong et al.
8,989,261 B2 3/2015 Chong et al.
10,123,050 B2 11/2018 Karczewicz et al.
2001/0023454 A1 9/2001 Fitzgerald
2002/0150166 A1 10/2002 Johnson
2003/0026495 A1 2/2003 Gondek et al.
2003/0117585 A1 6/2003 Lee
2003/0169931 A1 9/2003 Lainema
2003/0190086 A1 10/2003 Kim
2004/0008787 A1 1/2004 Pun et al.
2004/0012582 A1 * 1/2004 Kim .................... H04N 19/117 375/E7.176
2004/0125113 A1 7/2004 Kempf et al.
2004/0161035 A1 8/2004 Wedi
2004/0179610 A1 9/2004 Lu et al.
2004/0179743 A1 9/2004 Shibata et al.
2005/0013363 A1 1/2005 Cho et al.
2005/0013559 A1 1/2005 Amorim et al.
2005/0053288 A1 3/2005 Srinivasan et al.
2005/0100235 A1 5/2005 Kong et al.
2005/0100236 A1 * 5/2005 Kong .................... G06V 10/50 375/E7.176
2005/0100237 A1 * 5/2005 Kong .................... G06V 10/44 375/E7.176
2005/0100241 A1 * 5/2005 Kong .................... H04N 19/61 382/268
2005/0117807 A1 6/2005 Shohdohji
2005/0123038 A1 * 6/2005 Otsuka .................. H04N 19/14 375/E7.193
2005/0135699 A1 6/2005 Anderson et al.
2005/0175093 A1 8/2005 Haskell et al.
2005/0190292 A1 9/2005 Yu et al.
2005/0196063 A1 9/2005 Guangxi et al.
2005/0200733 A1 9/2005 Malvar et al.
2005/0201633 A1 9/2005 Moon et al.
2006/0028562 A1 2/2006 Schmitz et al.
2006/0095612 A1 5/2006 Fitzgerald
2006/0110056 A1 5/2006 Gambhire
2006/0125816 A1 * 6/2006 Kim .......................... G06T 5/20 375/E7.161
2006/0146352 A1 * 7/2006 Guan ........................ G06T 5/70 358/1.9
2006/0171473 A1 * 8/2006 Schoner ............... H04N 19/176 375/240.27
2006/0193529 A1 8/2006 Boon et al.
2006/0262854 A1 11/2006 Lelescu et al.
2006/0268990 A1 11/2006 Lin et al.
2006/0285597 A1 12/2006 Gupta et al.
2006/0288065 A1 12/2006 Lelescu
2006/0294171 A1 12/2006 Bossen et al.
2007/0053373 A1 3/2007 Fitzgerald et al.
2007/0064798 A1 3/2007 Paniconi et al.
2007/0110329 A1 * 5/2007 Moon .................... H04N 19/17 382/168
2007/0140574 A1 6/2007 Yamaguchi et al.
2007/0165282 A1 7/2007 Sambongi et al.
2007/0172153 A1 7/2007 Song
2007/0230565 A1 10/2007 Tourapis et al.
2007/0291842 A1 * 12/2007 Au ........................ H04N 19/86 375/E7.19
2008/0002902 A1 1/2008 Lin et al.
2008/0019605 A1 1/2008 Yea et al.
2008/0024513 A1 1/2008 Raveendran
2008/0063085 A1 3/2008 Wu et al.
2008/0159649 A1 7/2008 Kempf et al.
2008/0175498 A1 7/2008 Lee et al.
2008/0240559 A1 10/2008 Malvar
2009/0010539 A1 1/2009 Guarnera et al.
2009/0022220 A1 1/2009 Vatis et al.
2009/0028459 A1 1/2009 Frishman et al.
2009/0086816 A1 4/2009 Leontaris et al.
2009/0092337 A1 * 4/2009 Nagumo ................ H04N 5/145 382/299
2009/0116762 A1 * 5/2009 Lin .......................... G06T 5/20 382/261
2009/0147111 A1 6/2009 Litvinov et al.
2009/0252221 A1 * 10/2009 Park ..................... H04N 19/136 375/E7.243
2009/0257668 A1 10/2009 Ye et al.
2009/0290637 A1 11/2009 Lai et al.
2010/0008430 A1 1/2010 Karczewicz et al.
2010/0014763 A1 1/2010 Wittmann et al.
2010/0023336 A1 1/2010 Shmunk
2010/0027686 A1 2/2010 Zuo et al.
2010/0053415 A1 3/2010 Yun
2010/0092100 A1 4/2010 Madnani
2010/0104027 A1 4/2010 Youn et al.
2010/0142844 A1 6/2010 Pereira et al.
2010/0177822 A1 7/2010 Karczewicz et al.
2010/0177973 A1 * 7/2010 Wedi ...................... H04N 19/46 382/233
2010/0220788 A1 9/2010 Wittmann et al.
2010/0272191 A1 10/2010 Dorea et al.
2010/0284458 A1 11/2010 Andersson et al.
2010/0284461 A1 11/2010 Andersson et al.
2011/0026599 A1 2/2011 Andersson et al.

(56) References Cited

U.S. PATENT DOCUMENTS

2011/0255797 A1 10/2011 Ikai
2011/0274158 A1 11/2011 Fu et al.
2012/0213271 A1 8/2012 Chong et al.
2012/0213291 A1 8/2012 Chong et al.
2012/0213292 A1 8/2012 Chong et al.
2012/0213293 A1 8/2012 Chong et al.
2014/0050268 A1 2/2014 Caviedes et al.
2015/0117554 A1 4/2015 Chong et al.
2015/0117555 A1 4/2015 Chong et al.
2019/0089989 A1 3/2019 Karczewicz et al.
2023/0254515 A1 8/2023 Karczewicz et al.

FOREIGN PATENT DOCUMENTS

CN 101208957 A 6/2008
EP 1033883 A1 9/2000
EP 1408697 A1 4/2004
EP 1432249 A1 6/2004
EP 1499134 A1 1/2005
EP 1513349 A2 3/2005
EP 1603338 A1 12/2005
EP 1744279 A1 1/2007
EP 2262267 A1 12/2010
JP 61002482 A 1/1986
JP 2004343334 A 12/2004
JP 2005501442 A 1/2005
JP 2005514872 A 5/2005
JP 2005318614 A 11/2005
JP 2006148878 A 6/2006
JP 2007506361 A 3/2007
JP 2010514246 A 4/2010
RU 2295203 C2 3/2007
RU 2302707 C2 7/2007
TW 201034467 A 9/2010
WO 0019900 A1 4/2000
WO WO-0154415 A1 7/2001
WO WO-03058945 A2 7/2003
WO WO-03094529 A2 11/2003
WO WO-2005034517 A1 4/2005
WO WO-2006012384 2/2006
WO WO-2006108654 A2 10/2006
WO WO-2007111292 A1 10/2007
WO WO-2007117240 A1 10/2007
WO WO-2008010929 A2 1/2008
WO WO-2008038238 A2 4/2008
WO WO-2008075247 A1 6/2008
WO WO-2008084378 A2 7/2008
WO 2008141098 A2 11/2008
WO WO-2008148272 12/2008
WO WO-2010083438 7/2010
WO WO-2011126759 A1 10/2011

OTHER PUBLICATIONS

Bross B., et al., "High Efficiency Video Coding (HEVC) Text Specification Draft 6", JCTVC-H1003 version 22, Joint Collaborative Team on Video Coding (JCT-VC) of ITU-T SG16 WP3 and ISO/IEC JTC1/SC29/WG11, 8th Meeting, San Jose, CA, USA, 99. MPEG Meeting, Feb. 1-10, 2012, 34, 54-55, 74-75, 90-98, 220-224, URL: http://wftp3.itu.int/AV-ARCH/JCTVC-SITE/ , XP030111769, 259 Pages, Apr. 2, 2012.

Bross B., et al., "High Efficiency Video Coding (HEVC) Text Specification Draft 7," JCTVC-I1003 d2, 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.1tu.int/av-arch/jctvc-site/ , No. JCTVC-11003, May 10, 2012 (May 10, 2012), XP030112373, 290 pages.

Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team on Video Coding of ISO/IEC JTC1/SC29/WG11 and ITU-T SG.16); URL: http://wftp3.itu.int/av-arch/jctvc-site/ ,, No. JCTVC-J1003_d7, XP030112947, Jul. 28, 2012 (Jul. 28, 2012), pp. 197-201, section A.4.1 ,A.4.2, 260 Pages.

Bross B., et al., "WD4: Working Draft 4 of High-Efficiency Video Coding," JCTVC-F803_d2, (JCT-VC) of ITU-T SG16 WP3 and ISO/IEC JTC1/SC29/WG11) Joint Collaborative Team on Video Coding, 6th Meeting, Torino, IT, Jul. 14-22, 2011, No. m21449. Nov. 20, 2011 (Nov. 20, 2011), XP030050012, [retrieved on Jul. 14, 2011], abstract, tables 7-14, Sections 7.1. 7.2. 9.3, 226 pages.

Bross B., et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pages.

Chen C-Y., et al., "CE8 Subset2: A Joint Proposal on Improving the Adaptive Loop Filter in TMuC0.9 by MediaTek, Qualcomm, and Toshiba", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-TSG.16); No. JCTVC-D119, Jan. 15, 2011, pp. 1-18, XP030008159, p. 2, paragraph 2-2.1; figure 1 p. 7, 9 and 11, paragraph 2.6; table 1. Section 2.1, 2.5, Algorithm description Filter unit and filter set;p. 1. paragraph 2-2.1, p. 8-9.

Chong I. S., et al., "CE8 Subtest 2: Block Based Adaptive Loop Filter (ALF)," 96. MPEG Meeting, Joint Collaborative Team on Video Coding (JCT-VC) of ITU-T SG16 WP3 and ISO/IEC JTC1/SC29/WG11, No. m19851, 5th Meeting: Mar. 21, 2011-Mar. 25, 2011 Geneva, CH, Mar. 18, 2011, JCTVC-E323, XP030048418, pp. 1-5, p. 2, paragraph 2, Abstract; p. 1 , Block adaptive loop filter; p. 2, lines 1-5, paragraph 2.

Chujoh, et al., "Quadtree-Based Adaptive Loop Filter", ITU-T SG16 Contribution, COM 16-C181, Geneva, Jan. 2009, 4 pp.

Chujoh T., et al., "Specification and experimental results of quadtree-based adaptive loop filter", 37. VCEG meeting, Apr. 15, 2009 (Apr. 15, 2009), XP002675788, Yokohama Retrieved from the Internet: URL: http://wftp3.itu.int/av-arch/video-site/0904_Yok/VCEG-AK22.zip [retrieved on May 11, 2012], 11 pages.

Fu C-M., et al., "CE8 Subset3: Picture Quadtree Adaptive Offset", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-Site/, (Jan. 15, 2011), 10 Pages, No. JCTVC-D122, Jan. 20, 2011-Jan. 28, 2011, ISSN 0000-0015, XP030008162 [Y] 1-46, pp. 1-4.

Gonzalez, R.C., et al., "Digital Image Processing, Chapter 10: Image Segmentation", Jan. 1, 2008 (2008-01-0), Digital Image Processing, Pearson Education, Inc, New Jersey, pp. 719-727, XP002669229, ISBN: 978-0-13-505267-9.

Gonzalez, R.C., et al., "Digital Image processing", Digital Image Processing, XX, XX, Jan. 1, 1992 (Jan. 1, 1992), pp. 189-201, XP002955339.

Gonzalez, R.C., et al., "Digital Image Processing, Image Enhancement in the Spatial Domain", Jan. 1, 2002 (Jan. 1, 2002 ), Digital Image Processing, Prentice-Hall, Upper Saddle River, New Jersey, pp. 128-134, XP001152050, ISBN: 978-0-201-18075-6.

Ikai et al., "CE8.2: Region-Based Adaptive Loop Filter using Two-Dimensional Feature", Joint Collaborative Team on Video Coding (JCT-VC) of ITU-T SG16 WP3 and ISO/IEC JTC1/SC29/WG11, 5th Meeting: Geneva, Switzerland, Mar. 2011, JCTVC-E141, pp. 1-7.

Ikai, et al., "Region-based adaptive loop filter using two-dimensional feature", Joint Collaborative Team on Video Coding (JCT-VC) of ITU-T SG16 WP3 and ISO/IEC JTC1/SC29/WG11, Document JCTVC-D116, 4th Meeting: Daegu, KR, Jan. 20-18, 2011, pp. 1-12.

Ikai T., et al., "CE8.1: Block based Adaptive Loop Filter with flexible syntax and additional BA mode by Sharp and Qualcomm," Joint Collaborative Team on Video Coding (JCT-VC) of ITU-T

(56) References Cited

OTHER PUBLICATIONS

SG16 WP3 and ISO/IEC JTC1/SC29/WG11, 6th Meeting: Torino, IT, Jul. 2011, JCTVC-F384r2, pp. 1-6.
International Preliminary Report on Patentability—PCT/US2009/050237, the International Bureau of WIPO—Geneva, Switzerland, Oct. 1, 2010.
International Preliminary Report on Patentability—PCT/US2010/021239, the International Bureau of WIPO—Geneva, Switzerland, May 24, 2011
International Preliminary Report on Patentability—PCT/US2012/026154, the International Bureau of WIPO—Geneva, Switzerland, Jun. 26, 2013.
International Preliminary Report on Patentability—PCT/US2012/026160, the International Bureau of WIPO—Geneva, Switzerland, Jun. 25, 2013.
International Preliminary Report on Patentability—PCT/US2012/026165, the International Bureau of WIPO—Geneva, Switzerland, Jun. 25, 2013.
International Preliminary Report on Patentability—PCT/US2012/026166, the International Bureau of WIPO—Geneva, Switzerland, Jun. 25, 2013, 20 pp.
International Search Report & Written Opinion—PCT/US2009/050237, International Search Authority—European Patent Office—Nov. 10, 2009.
International Search Report and Written Opinion—PCT/US2012/026154—ISA/EPO—Nov. 10, 2009.
International Search Report and Written Opinion—PCT/US2012/026160—ISA/EPO—Jun. 12, 2012.
International Search Report and Written Opinion—PCT/US2012/026165—ISA/EPO—Jun. 12, 2012.
International Search Report and Written Opinion—PCT/US2012/026166—ISA/EPO—Apr. 11, 2012.
International Search Report and Written Opinion—PCT/US2010/021239, International Search Authority—European Patent Office—Sep. 27, 2010.
International Telecommunication Union, "ITU-T H.264, Series H: Audiovisual and Multimedia Systems, Infrastructure of Audiovisual Services—Coding of Moving Video, Advanced Video Coding for Generic Audiovisual Services," Mar. 2010, 669 pp.
ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.
ITU-T H.265, Series H: Audiovisual and Multimedia Systems, Infrastructure of Audiovisual Services—Coding of Moving Video, Advanced Video Coding for Generic Audiovisual Services, The International Telecommunication Union, Oct. 2014, 540 pp.
ITU-T H.265, Series H: Audiovisual and Multimedia Systems, Infrastructure of Audiovisual Services—Coding of Moving Video, High Efficiency Video Coding, The International Telecommunication Union, Apr. 30, 2013, 317 Pages, (pp. 227-228,231, 237-241, 250-251, 276-278), Retrieved from the Internet: https://www.itu.int/rec/dologin_pub.asp?lang=e&id=H.265-201304-S!!PDF-E&type=items.
Jahne B., Digital Image Processing, Springer-Verlag Berlin Heidelberg, 2005, 6th Edition.
Jahne, B., "Digital image processing," Technosphera, Moscow, 2007, pp. 331-338 (English version: 6th edition of B. Jahne, Digital image processing, Springer-Verlag Berlin Heidelberg, 2005, pp. 331-338).
Karczewicz M., et al., "Adaptive Filter Based on Combination of Sum-Modified Laplacian Filter Indexing and Quadtree Partitioning", 38. VCEG Meeting; 89, MPEG Meeting; Jul. 1, 2009-Jul. 8, 2009; London, Geneva; (Video Coding Experts Group of ITU-T SG. 16), No. VCEG-AL27, Jul. 3, 2009 (Jul. 3, 2009), XP030003708, ISSN: 0000-0084 p. 1.
Karczewicz M., et al., "Post-filter applicability to intra coding" 33. VCEG Meeting; 83. MPEG Meeting; Jan. 12, 2008-Jan. 13, 2008; Antalya; (Video Coding Experts Group of ITU-T SG.16), No. VCEG-AH26, Jan. 9, 2008 (Jan. 9, 2008), XP030003564 the whole document.
Karczewicz M., et al., "Post-Filter SEI Message Extensions," 35. VCEG Meeting, 85. MPEG Meeting; Jul. 16, 2008-Jul. 18, 2008; Berlin; (Video Coding 'Experts Group of ITU-T SG.16), Jul. 12, 2008 (Jul. 12, 2008), pp. 1-3, XP030003599.
Karczewicz M., et al., "Video Coding Technology Proposal by Qualcomm Inc.," JCTVC-A121, Joint Collaborative Team on Video Coding(JCT-VC) of ITU-T SG16 WP3 and ISO/IEC JTC1/SC29/WG11, 1st Meeting: Dresden, DE, Apr. 15-23, 2010, 2 pages.
Karczewicz (Qualcomm) M., et al., "Video Coding Technology Proposal by Qualcomm Inc", 1. JCT-VC Meeting; JCTVC-A121, Apr. 15, 2010-Apr. 23, 2010; Dresden; (Joint Collaborative Team on Video Coding of ISO/IEC JTC1/SC29/WG11 and ITU-TSG.16), No. XP030007566, (May 18, 2010), pp. 1-24, XP030007567.
Kawamura K. et al., "Adaptive loop filtering using directional activity", JCTVC-E190, KDDI Corp., Mar. 2011, pp. 1-3.
Lai, et al., "Loop filter with directional similarity mapping (DSM)", Joint Collaborative Team on Video Coding (JCT-VC) of ITU-T SG16 WP3 and ISO/IEC JTC1/SC29/WG11, Document JCTVC-D221, 4th Meeing: Daegu, KR, Jan. 20-28, 2011, pp. 1-8.
Lai W., et al., "CE8 Subtest 1: Block-Based Filter Adaptation with Features on Subset of Pixels," Joint Collaborative Team on Video Coding (JCT-VC) of ITU-T SG16 WP3 and ISO/IEC JTC1/SC29/WG11, 6th Meeting: Torino, Italy, Jul. 14-22, 2011, Document JCTVC-F301, pp. 1-5.
Lee J-S., "Refined Filtering of Image Noise Using Local Statistics", Computer Graphics and Image Processing, vol. 15, No. 4, Apr. 1981, pp. 380-389.
List, P., et al., "Adaptive Deblocking Filter", IEEE Transactions on Circuits and Systems for Video Technology, IEEE Service Center, Piscataway, NJ, US, vol. 13, No. 7, Jul. 1, 2003, XP011221094, pp. 614-619, Table 1, p. 615, Right-Hand column.
McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.
Second Written Opinion from international application No. PCT/US2012/026166, dated Mar. 26, 2013, 8pp.
Second Written Opinion of international application No. PCT/US2012/026154, dated Mar. 26, 2013, 10 pp.
Second Written Opinion of international application No. PCT/US2012/026160, dated Mar. 25, 2013, 11 pp.
Second Written Opinion of international application No. PCT/US2012/026165, dated Mar. 25, 2013, 12 pp.
Shin S.H., et al., "Variable Block-Based Deblocking Filter for H.264/AVC on Low-end and Low-bit Rates Terminals", Signal Processing: Image Communication, vol. 25, Issue 4, Apr. 2010, pp. 255-267.
Taiwan Search Report—TW098123557—TIPO—Oct. 22, 2012.
Taiwan Search Report—TW099101168—TIPO—Dec. 19, 2012.
Taiwan Search Report—TW101105899—TIPO—Feb. 25, 2015.
Tsai C. Y., et al., "TE10 subtest 2: Coding unit synchronous picture quadtree-based adaptive loop filter (QALF)", 94. MPEG Meeting; Oct. 11, 2010-Oct. 15, 2010; Guangzhou; (Motion Picture Expert Group or ISO/IECJTC1/SC29/WG11),, No. M18169, Oct. 28, 2010 (Oct. 28, 2010), XP030046759, p. 1 p. 2, paragraph 2.1—p. 4, paragraph 2.2 p. 7; table 2.
U.S. Appl. No. 13/401,548, by In Suk Chong, filed Feb. 21, 2012.
U.S. Appl. No. 13/401,552, by In Suk Chong, filed Feb. 21, 2012.
U.S. Appl. No. 13/401,573, by In Suk Chong, filed Feb. 21, 2012.
U.S. Appl. No. 13/401,685, by In Suk Chong, filed Feb. 21, 2012.
Vatis Y., et al., "Coding of Coefficients of Two-Dimensional Non-Separable Adaptive Wiener Interpolation Filter", Proceeding of the Spie—The International Society for Optical Engineering, SPIE, PO Box 10 Bellingham WA 98227-0010 USA, vol. 5960, Dec. 7, 2005, pp. 623-631, XP002419200, DOI: 10.1117/12.632494, ISBN: 978-1-62841-730-2.
Vatis Y et al: "Motion-And Aliasing-Compensated Prediction Using a Two-Dimensional Non-Separable Adaptive Wiener Interpolation Filter" Image Processing, 2005. ICIP 2005. IEEE International

(56) References Cited

OTHER PUBLICATIONS

Conference on Genova, Italy Sep. 11-14, 2005, Piscataway, NJ, USA, IEEE, vol. 2, Sep. 11, 2005 (Sep. 11, 2005), pp. 894-897, XP010851198 ISBN: 978-0-7803-91 34-5.
Wedi T., "Adaptive Interpolation Filter for Motion Compensated Prediction", Proc. IEEE International Conference on Image Processing (ICIP), New York, vol. 2, Sep. 2002, pp. II-509-II-512.
Wiegand, T. et al.: "Overview of the H.264/AVC Video Coding Standard," IEEE Transactions on Circuits and Systems for Video Technology, vol. 13, No. 7, Jul. 2003, 19 pp, XP011099249, ISSN: 1051-8215.
Wiegand T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 Pages.
Wiegand T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 Pages.
Wiegand T., et al., "WD3: Working Draft 3 of High-Efficiency Video Coding", JCTVC-E603_d8, Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 239 Pages, Paragraph [8.6.1], Tables 8-13, ISSN:0000-0003.
Wittmann S., et al., "Transmission of Post-Filter Hints for Video Coding Schemes", IEEE International Conference on Image Processing, Sep. 16, 2007-Oct. 19, 2007, 4 pages.
Yamakage T., et al., "Tool Experiment 10: In-loop filtering", 2. JCT-VC Meeting; Jul. 21, 2010-Jul. 28, 2010; Geneva; (Joint Collaborative Team on Video Coding of ISO/IEC JTC1/SC29/WG11 and ITU-T SG.16); No. JCTVC-B310, Aug. 30, 2010, XP030007715, pp. 1-15, ISSN: 0000-0046 p. 1 p. 9,Introduction;p. 1,paragraph [4.2.6.1]—paragraph[4. 2. 7. 2] ,Content adaptive deblocking;p. 6, paragraph 4.7.1.1—p. 7, Adaptive Filter based on Combination of Sum-Modified Laplacian Filter;p. 9, paragraph 4.2.4.

* cited by examiner

FILTERING VIDEO DATA USING A PLURALITY OF FILTERS

I. CLAIM OF PRIORITY

This application is a continuation of U.S. Non-Provisional patent application Ser. No. 16/153,652 filed Oct. 5, 2018, which issued as U.S. Pat. No. 11,711,548, on Jul. 25, 2023, which is a continuation of U.S. Non-Provisional patent application Ser. No. 12/406,585 filed Mar. 18, 2009, which issued as U.S. Pat. No. 10,123,050, on Nov. 6, 2018, which claims priority from U.S. Provisional Patent Application No. 61/079,998 filed Jul. 11, 2008, and U.S. Provisional Patent Application No. 61/094,011 filed Sep. 3, 2008, each of which is incorporated herein by reference in its entirety.

II. FIELD OF THE DISCLOSURE

The present disclosure is generally directed to a system and method to filter video data using a plurality of filters.

III. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

One type of video processing involves filtering, which may be applied to enhance the quality of a decoded video signal. The filter can be applied as a post-filter, where the filtered frame is not used for prediction of future frames, or as an in-loop filter, where the filtered frame is used to predict future frames. A filter may be designed by reducing an error between the original signal and the decoded filtered signal. Similarly, to transform coefficients, the coefficients of the resulting filter may be quantized, coded, and sent to the video decoder. More precise quantized filter coefficients may enable better performance. However, as precision of quantized filter coefficients increases, a number of bits required to transmit the coefficients may also increase, with a corresponding impact on network resources, data delivery rates, or both.

IV. SUMMARY

Multiple filters may be determined at a video encoder and provided to a receiver via a video data stream. The receiver may extract information from the data stream to identify which of the multiple filters to apply to a particular frame, a particular macroblock, a particular pixel, or any combination thereof. The multiple filters may be used for post-processing filtering or for filtering within a processing loop at a decoder.

In a particular embodiment, a method is disclosed that includes receiving and decoding a plurality of filters embedded in a video data bitstream at a video decoder. The method includes selecting, based on information included in the video data bitstream, a particular filter of the plurality of filters. The method further includes applying the particular filter to at least a portion of decoded video data of the video data bitstream to produce filtered decoded video data.

In another embodiment, an apparatus is disclosed that includes a video decoder configured to receive and decode a plurality of filters embedded in a video data bitstream. The apparatus also includes a processor configured to select, based on information included in the video data bitstream, a particular filter of the plurality of filters and to apply the particular filter to at least a portion of decoded video data of the video data bitstream to produce filtered decoded video data.

In another embodiment, an integrated circuit is disclosed that includes video decoding circuitry configured to receive and decode a signal including a plurality of filters embedded in a video data bitstream. The integrated circuit also includes processing circuitry configured to process the decoded signal to select, based on information included in the video data bitstream, a particular filter of the plurality of filters and to apply the particular filter to at least a portion of decoded video data of the video data bitstream to produce filtered decoded video data.

In another embodiment, an apparatus is disclosed that includes means for decoding a plurality of filters embedded in a video data bitstream. The apparatus includes means for selecting, based on information included in the video data bitstream, a particular filter of the plurality of filters. The apparatus further includes means for applying the particular filter to at least a portion of decoded video data of the video data bitstream to produce filtered decoded video data.

In another embodiment, a computer-readable medium storing computer executable code is disclosed. The computer-readable medium includes code for receiving and decoding a plurality of filters embedded in a video data bitstream at a video decoder. The computer-readable medium includes code for selecting, based on information included in the video data bitstream, a particular filter of the plurality of filters. The computer-readable medium further includes code for applying the particular filter to at least a portion of decoded video data of the video data bitstream to produce filtered decoded video data.

One particular advantage provided by disclosed embodiments is an improvement in the performance of filtering, particularly in the performance of post-filtering in order to enhance the quality of a decoded video signal. Another particular advantage provided by disclosed embodiments is a reduced number of bits required to transmit filter coefficients of a plurality of filters.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
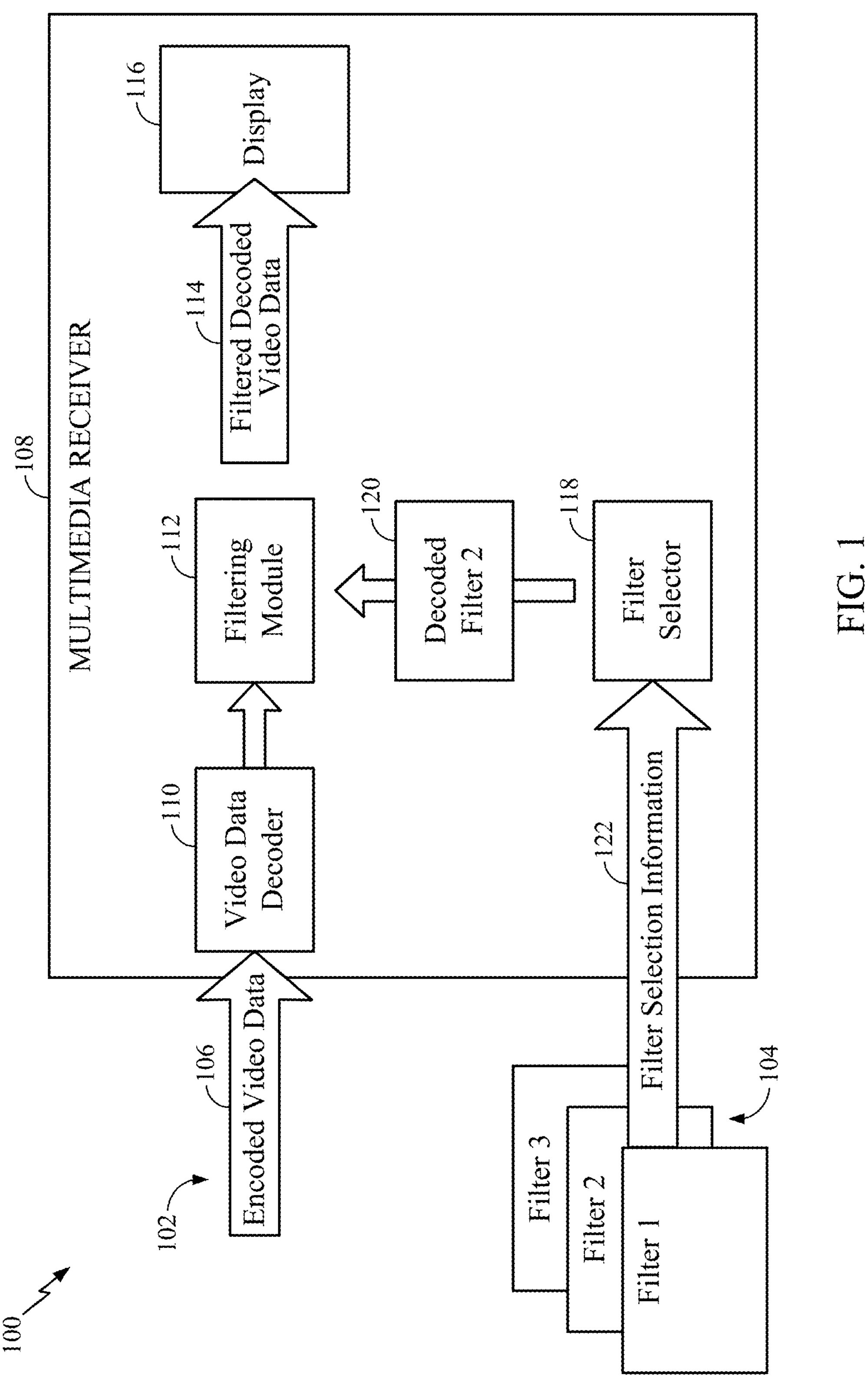
FIG. 1 is a block diagram of a particular illustrative embodiment of a video data processing system that includes a video data bitstream and a multimedia receiver.

Referring to FIG. 1, a particular embodiment of a video data processing system 100 is illustrated. The video data processing system 100 includes a video data bitstream 102 received by a multimedia receiver 108. The video data bitstream 102 includes encoded video data 106, a plurality of filters 104, and filter selection information 122. The multimedia receiver 108 includes a video data decoder 110, a filtering module 112, a filter selector 118, and a display 116. The system 100 enables the multimedia receiver 108 to select a filter from the video data bitstream 102 based on the filter selection information 122.

The video data decoder 110 is configured to decode the encoded video data 106. For example, the video data decoder 110 may be configured to decode entropy encoded data and to perform an inverse discrete cosine transform (DCT) on the resulting data. In a particular embodiment, the video data decoder 110 includes a H.264 or Moving Pictures Expert Group (MPEG) compatible decoder.

The filtering module 112 is configured to receive a filter from the filter selector 118, such as the second decoded filter 120. The filtering module 112 is configured to apply the received filter 120 to decoded video data received from the video data decoder 110. The filtering module 112 may be configured to apply the filter to the decoded video data on a frame, macroblock, or pixel granularity, to produce filtered decoded video data 114 that is provided to the display 116. The filtering module 112 may be implemented within a decoding loop (not shown), or for post-processing filtering, or any combination thereof.

The filter selector 118 is configured to receive the filter selection information 122 and to select appropriate filters from the plurality of filters 104. In a particular embodiment, the filter selector 118 is adapted to decode the plurality of filters 104 and to provide selected decoded filters, such as the second decoded filter 120, to the filtering module 112. The filter selector 118 may select decoded filters to provide to the filtering module 112 based on the filter selection information 122. In a particular embodiment, the filter selector 118 compares one or more characteristics of the decoded video data that is generated by the video data decoder 110 to the filter selection information 122 to select an appropriate filter for the particular video data that is provided to the filtering module 112.

During operation, the encoded video data 106 is received and decoded by the video data decoder 110 of the multimedia receiver 108. The plurality of filters 104 and the filter selection information 122 are received and decoded at the filter selector 118 of the multimedia receiver 108. The filter selector 118 selects a particular decoded filter 120 of the plurality of filters 104 based on the filter selection information 122 included in the video data bitstream 102. The particular decoded filter 120 is applied to at least a portion of the decoded video data at the filtering module 112 of the multimedia receiver 108, producing the filtered decoded video data 114. The filtered decoded video data 114 is displayed at the display 116 of the multimedia receiver 108.

By receiving multiple filters with the encoded video data 106, the multimedia receiver 108 can select particular filters that result in a lowest error of each unit of decoded video data. For example, a filter can be selected that provides a lowest mean square error for a particular frame of video data, on a frame-by-frame basis. As another example, a filter can be selected that provides a lowest error for a particular macroblock at a macroblock-by-macroblock basis, or at a pixel-by-pixel basis. The video data processing system 100 may therefore provide an improvement in the performance of filtering, particularly in the performance of post-filtering in order to enhance the quality of a decoded video signal. In addition, by encoding the filter coefficients and in some embodiments, using coefficients of some filters to predict coefficients of later filters, the video data processing system 100 further provides a reduction in the number of bits required to transmit filter coefficients of each filter of the plurality of filters 104.

Figure 2:
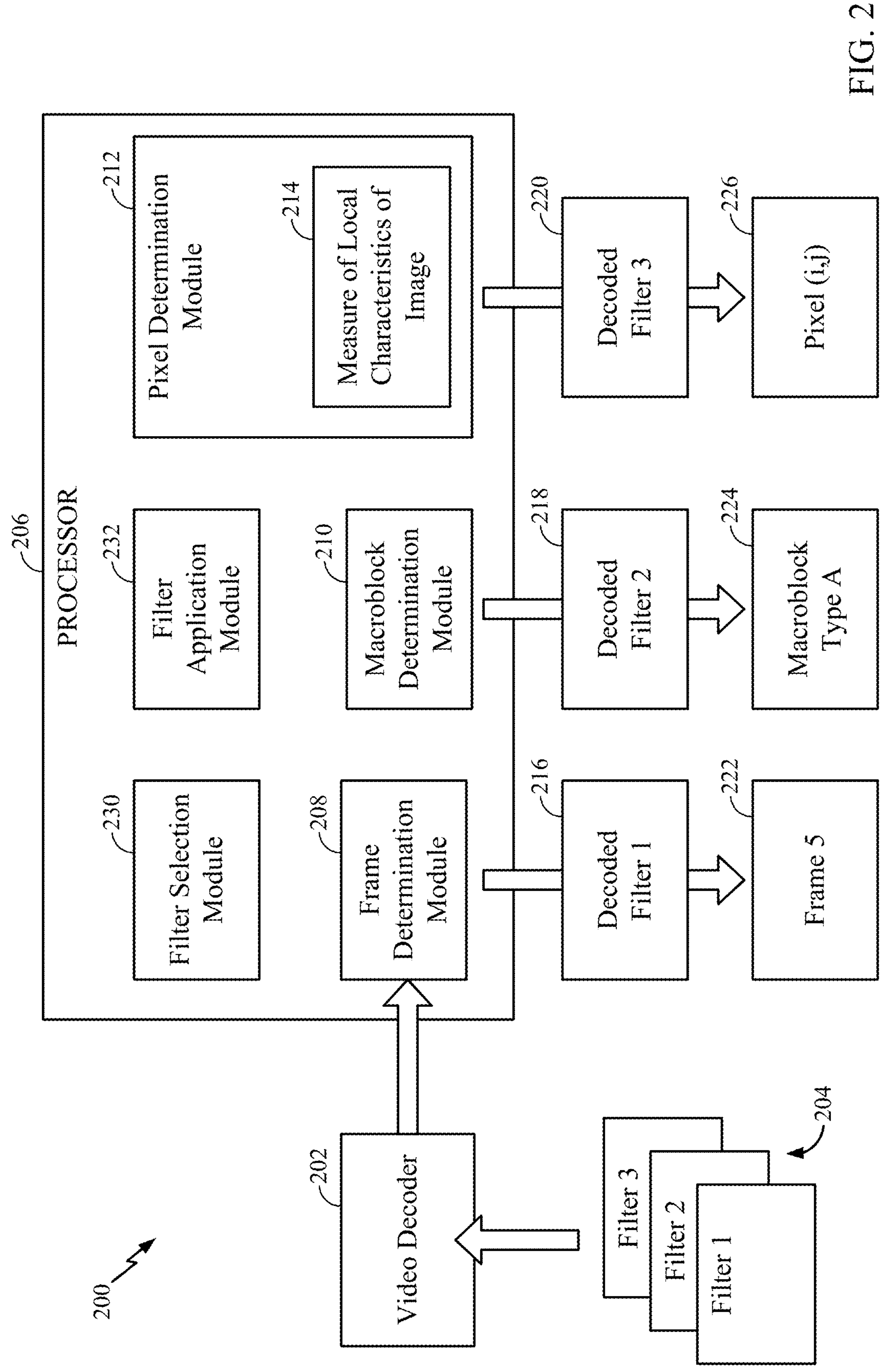
FIG. 2 is a block diagram of a particular illustrative embodiment of a video data processing apparatus that includes a video decoder and a processor.

Referring to FIG. 2, a particular embodiment of a video data processing apparatus 200 is illustrated. The video data processing apparatus 200 includes a video decoder 202 and a processor 206. The video decoder 202 is configured to receive and decode a plurality of filters 204 embedded in a video data bitstream. In a particular embodiment, at least a portion of video data in the video data bitstream is encoded using MPEG encoding. The processor 206 includes a frame determination module 208, a macroblock determination module 210, a pixel determination module 212, a filter selection module 230, and a filter application module 232. In an illustrative embodiment, the video decoder 202 is the video data decoder 102 of FIG. 2, and the plurality of filters 204 is embedded in a video data bitstream in a similar manner as the plurality of filters 104 of FIG. 1 embedded in the video data bitstream 102.

In a particular embodiment, the filter selection module 230 is executable by the processor 206 to select a particular filter of the plurality of filters 204 based on information included in the video data bitstream. In a particular embodiment, the information included in the video data bitstream is similar to the filter selection information 122 of FIG. 1 included in the video data bitstream 102.

In a particular embodiment, the filter application module 232 is executable by the processor 206 to apply the particular filter selected by the filter selection module 230 to at least a portion of decoded video data of the video data bitstream to produce filtered decoded video data. In a particular embodiment, the filtered decoded video data produced is similar to the filtered decoded video data 114 of FIG. 1.

In a particular embodiment, the frame determination module 208 is executable by the processor 206 to determine frames of the video data for which each filter of the plurality of filters 204 is to be applied, where the information included in the video data bitstream identifies frames corresponding to each filter by at least one of a frame number or a frame type. In a particular embodiment, the frame types can include an intra-coded pictures frame (I-frame) type, a predictive pictures frame (P-frame) type, or a bi-predictive pictures frame (B-frame) type. For example, the frame determination module 208 may determine a frame number of each frame and provide the determined frame number to the filter selection module 230. To illustrate, the frame determination module 208 may determine that a particular frame 222 being processed has a frame number "5," in response to which the filter selection module 230 selects a first decoded filter 216 to be applied to the decoded frame with number "5" 222. Different ways may be used to indicate which filters are to be used and which filters are to be combined. For example, it could be signaled to the decoder that for B-frame types, filters $f_1$, $f_2$, and $f_3$ should be used.

In a particular embodiment, the macroblock determination module 210 is executable by the processor 206 to determine macroblocks for which each filter of the plurality of filters 204 is to be applied. The information included in the video data bitstream may identify macroblocks corresponding to each filter by at least one of a listing of macroblock types (e.g., intra-frame, inter frame, bi-directional inter frame) or a range of quantization parameter values used to reconstruct the macroblocks, as illustrative, non-limiting examples. For example, the macroblock determination module 210 may determine a type of each macroblock and provide the determined macroblock type to the filter selection module 230. To illustrate, the macroblock determination module 210 may determine that a particular macroblock 224 being processed has a type "A" (e.g., an intra-frame type), in response to which the filter selection module 230 selects a second decoded filter 218 to be applied to the particular macroblock 224.

In a particular embodiment, the pixel determination module 212 is executable by the processor 206 to determine pixels to which each filter of the plurality of filters 204 is to be applied based on a predetermined measure of local characteristics of an image 214. The pixel determination module 212 may generate a value of the predetermined measure 214 for a particular pixel (i,j) 226 being processed at a row i and column j of a macroblock or a frame of the decoded video signal, in response to which the filter selection module 230 selects a third decoded filter 220 to be applied to the pixel (i,j) 226.

In a particular embodiment, the predetermined measure of local characteristics of the image 214 includes a variance value of a reconstructed image from a mean value of the reconstructed image. For example, for the reconstructed image R (i, j) where i=0, . . . , M and j=0, . . . , N, the mean value $\langle R(i, j)\rangle$ may be defined such that $$\langle R)i, j)\rangle = \frac{\sum_{k=-K}^{K}\sum_{l=-L}^{L} R(i+k, j+l)}{(2K+1)(2L+1)}.$$

The variance value var(i, j) of the reconstructed image R(i, j) from the mean value $\langle R(i,j)\rangle$ may be defined such that $$\mathrm{var}(i, j) = \frac{\sum_{k=-K}^{K}\sum_{l=-L}^{L} (R(i+k, j+l) - \langle R(i, j)\rangle)^2}{(2K+1)(2L+1)}.$$

In a particular embodiment, the predetermined measure of local characteristics of the image 214 includes absolute values of differences within a reconstructed image. For example, for the reconstructed image R(i, j) where i=0, . . . , M and j=0, . . . , N, the absolute value of differences abs (i, j) may be defined such that $$\mathrm{abs}(i, j) = \frac{\sum_{k=-K}^{K}\sum_{l=-L}^{L} |R(i+k, j+l) - R(i, j)|}{(2K+1)(2L+1)}.$$

In a particular embodiment, the predetermined measure of local characteristics of the image 214 includes gradient values within a reconstructed image. For example, a gradient of image values at a pixel of interest may be determined as the predetermined measure of local characteristics of the image 214. In another embodiment, the predetermined measure of local characteristics of the image 214 includes sharpness measures within a reconstructed image.

In a particular embodiment, a first filter of the plurality of filters 204 is applied to first pixels having a first value of the predetermined measure of local characteristics of the image 214 in a first range of values and a second filter of the plurality of filters 204 is applied to second pixels having a second value of the predetermined measure of local characteristics of the image 214 in a second range of values. For example, the filters $f_m$ for m=0, . . . , n+1 may be applied such that the filter $f_0$ is applied to pixels (i, j) having a variance value var (i j) that lies in the range $0 \le \mathrm{var}(i, j) < \mathrm{var}_0$, the filter f is applied to pixels (i, j) having a variance value var (i, j) that lies in the range $\mathrm{var}_0 \le \mathrm{var}(i, j) < \mathrm{var}_1$, and, generally, the filter $f_r$ for r=1, . . . , n is applied to pixels (i, j) having a variance value var (i, j) that lies in the range $\mathrm{var}_{r-1} \le \mathrm{var}(i, j) < \mathrm{var}_y$ where the filter $f_{n+1}$ is applied to pixels (i, j) having a variance value var (i, j) that lies in the range $\mathrm{var}_n \le \mathrm{var}(i, j)$. In an alternative embodiment, the filters $f_1$ and $f_2$ may be applied such that the filter $f_1$ is applied to pixels (i, j) having a variance value var (i, j) that lies in the range $0 \le \mathrm{var}(i, j) < \mathrm{var}_0$, the filter $f_1$ is applied to pixels (i, j) having a variance value var(i, j) that lies in the range $\mathrm{var}_0 \le \mathrm{var}(i, j) < \mathrm{var}_1$, and the filter $f_2$ is applied otherwise.

In a particular embodiment, quantized filter coefficients of each of the filters of the plurality of filters 204 are clipped to be within a range of about 0 to about 2 raised to the nth power. The range of about 0 to about 2 raised to the nth power may be divided into a number of intervals m. The number of intervals m is determined at least partially based on indices of the quantized filter coefficients of each of the filters of the plurality of filters 204. For example, the quantized filter coefficients $f_r$ (k,l) for r=0, . . . , s+1, k=−K, . . . , K, and l=−L, . . . , L may be clipped to be within the range $0 \le f_r(k,l)\ 2^n$. The range $0 \le f_r(k,l) \le 2^n$ may be divided into a number of intervals m, where the number of intervals m is determined at least partially based on the indices (k,l) of the quantized filter coefficients $f_r(k,l)$ for r=0, . . . , s+1, k=−K, . . . , K, and l=−L, . . . , L. In a particular embodiment, a particular quantized filter coefficient is determined by decoding a variable length codeword indicating a particular interval of the number of intervals m that corresponds to a value of the particular quantized filter coefficient, and by decoding a fixed length codeword specifying the value of the particular quantized filter coefficient within the particular interval.

In a particular embodiment, first filter coefficients of a first filter of the plurality of filters 204 are used to predict second filter coefficients of a second filter of the plurality of filters 204. For example, if filters $f_m$ for m=0, . . . , n+1 correspond to different values of variance var for r=0, . . . , n, as described above, filter $f_1$ may be predicted from filter $f_0$, filter $f_2$ may be predicted from filter $f_1$, and, generally, filter $f_{s+1}$ may be predicted from filter $f_s$ for s=0, . . . , n.

One or more of the modules 208, 210, 212, 230, and 232 may be implemented as computer executable code including program instructions executing at the processor 206, as dedicated hardware circuits, as state machines, as field programmable gate arrays (FPGAs), or any combination thereof. The processor 206 may execute one or more of the frame determination module 208, the macroblock determination module 210, and the pixel determination module 212, to determine filters to be applied to the decoded video data. In a particular embodiment, the video data processing apparatus 200 may include other components not shown, such as a display device configured to display the filtered decoded video data, similar to the display 116 shown in FIG. 1.

Figure 3:
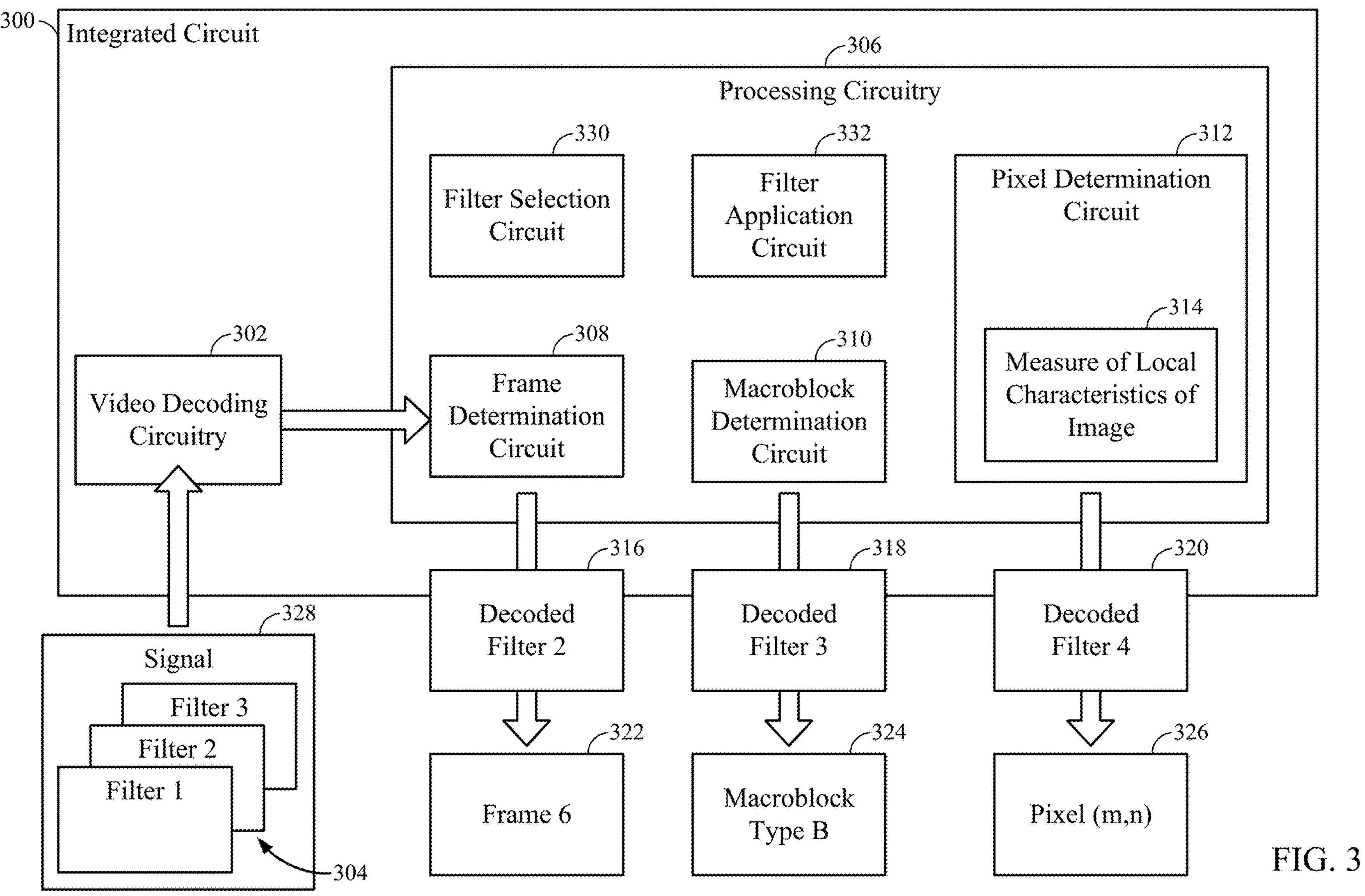
FIG. 3 is a block diagram of a particular illustrative embodiment of an integrated circuit that includes video decoding circuitry and processing circuitry.

Referring to FIG. 3, a video data processing integrated circuit 300 is illustrated. The video data processing integrated circuit 300 includes video decoding circuitry 302 and processing circuitry 306. The video decoding circuitry 302 is configured to receive and decode a signal 328 including a plurality of filters 304 embedded in a video data bitstream. In a particular embodiment, the plurality of filters 304 is embedded in a video data bitstream in a manner that is similar to the plurality of filters 104 of FIG. 1 embedded in the video data bitstream 102.

The processing circuitry 306 is configured to process the decoded signal 328 to select a particular filter of the plurality of filters 304 based on information included in the video data bitstream. In a particular embodiment, the information included in the video data bitstream is similar to the filter selection information 122 of FIG. 1 included in the video data bitstream 102. The processing circuitry 306 includes a frame determination circuit 308, a macroblock determination circuit 310, a pixel determination circuit 312, a filter selection circuit 330, and a filter application circuit 332. The processing circuitry 306 is configured to process the decoded signal from the video decoding circuitry 302 to apply a particular filter, such as a second decoded filter 316, a third decoded filter 318, or a fourth decoded filter 320, to at least a portion of decoded video data of the video data bitstream to produce filtered decoded video data. In a particular embodiment, the filtered decoded video data produced is similar to the filtered decoded video data 114 of FIG. 1.

In a particular embodiment, the frame determination circuit 308 is configured to determine frames for which each filter of the plurality of filters 304 is to be applied, where the information included in the video data bitstream identifies frames corresponding to each filter by at least one of a frame number or a frame type. For example, the frame determination circuit 308 may determine that a particular frame 322 has a frame number "6" and may provide the frame number to the filter selection circuit 330. The filter selection circuit 330 may select the second decoded filter 316 for the frame 322 based on the frame number and according to information received via the video data bitstream. The filter application circuit 332 may apply the second decoded filter 316 to the frame 322 with the frame number "6."

In a particular embodiment, the macroblock determination circuit 310 is configured to determine macroblocks for which each filter of the plurality of filters 304 is to be applied, where the information included in the video data bitstream identifies macroblocks corresponding to each filter by at least one of a listing of macroblock types or a range of quantization parameter values used to reconstruct the macroblocks. For example, the macroblock determination circuit 310 may determine that a particular macroblock 324 has a type "B" (e.g., a bi-directional inter frame type) and may provide the macroblock type to the filter selection circuit 330. The filter selection circuit 330 may select the third decoded filter 318 for the particular macroblock 324 based on the macroblock type and according to information received via the video data bitstream. The filter application circuit 332 may apply the third decoded filter 318 to the particular macroblock 324 with the type "B."

In a particular embodiment, the pixel determination circuit 312 is configured to process the decoded signal to determine pixels for which each filter of the plurality of filters 304 is to be applied based on a predetermined measure of local characteristics of an image 314. For example, the pixel determination circuit 312 may determine a value of the predetermined measure of local characteristics of the image 314 corresponding to a particular pixel(m,n) 326 at a row m and a column n, and may provide the value of the predetermined measure of local characteristics of the image 314 to the filter selection circuit 330. The filter selection circuit 330 may select the fourth decoded filter 320 for the pixel (m,n) 326 based on the value of the predetermined measure of local characteristics of the image 314 and according to information received via the video data bitstream. The filter application circuit 332 may apply the fourth decoded filter 320 to the pixel(m,n) 326. In a particular embodiment, the predetermined measure of local characteristics of the image 314 is determined in a substantially similar manner as the predetermined measure of local characteristics of the image 214 of FIG. 2, such as using a variance or a gradient, as illustrative, non-limiting examples.

In a particular embodiment, an apparatus includes means for decoding a plurality of filters embedded in a video data bitstream. The means for decoding a plurality of filters embedded in a video data bitstream may include a video decoder, such as the video decoder 202 shown in FIG. 2, video decoding circuitry, such as the video decoding circuitry 302 shown in FIG. 3, corresponding hardware, software, firmware, or any combination thereof. The apparatus includes means for selecting, based on information included in the video data bitstream, a particular filter of the plurality of filters. The means for selecting a particular filter of the plurality of filters may include a processor, such as the processor 206 shown in FIG. 2, processing circuitry, such as the processing circuitry 306 shown in FIG. 3, corresponding hardware, software, firmware, or any combination thereof. The apparatus further includes means for applying the particular filter to at least a portion of decoded video data of the video data bitstream to produce filtered decoded video data. The means for applying the particular filter may include a processor, such as the processor 206 shown in FIG. 2, processing circuitry, such as the processing circuitry 306 shown in FIG. 3, corresponding hardware, software, firmware, or any combination thereof.

In a particular embodiment, the apparatus includes means for determining frames for which each filter of the plurality of filters is to be applied, where the information included in the video data bitstream identifies frames corresponding to each filter by at least one of a frame number or a frame type. The means for determining frames may include a processor, such as the processor 206 shown in FIG. 2, processing circuitry, such as the processing circuitry 306 shown in FIG. 3, corresponding hardware, software, firmware, or any combination thereof.

In a particular embodiment, the apparatus includes means for determining macroblocks for which each filter of the plurality of filters is to be applied, wherein the information included in the video data bitstream identifies macroblocks corresponding to each filter by at least one of a listing of macroblock types or a range of quantization parameter values used to reconstruct the macroblocks. The means for determining macroblocks may include a processor, such as the processor 206 shown in FIG. 2, processing circuitry, such as the processing circuitry 306 shown in FIG. 3, corresponding hardware, software, firmware, or any combination thereof.

In a particular embodiment, the apparatus includes means for determining pixels for which each filter of the plurality of filters is to be applied based on a predetermined measure of local characteristics of an image. The means for determining pixels may include a processor, such as the processor 206 shown in FIG. 2, processing circuitry, such as the processing circuitry 306 shown in FIG. 3, corresponding hardware, software, firmware, or any combination thereof.

Figure 5:
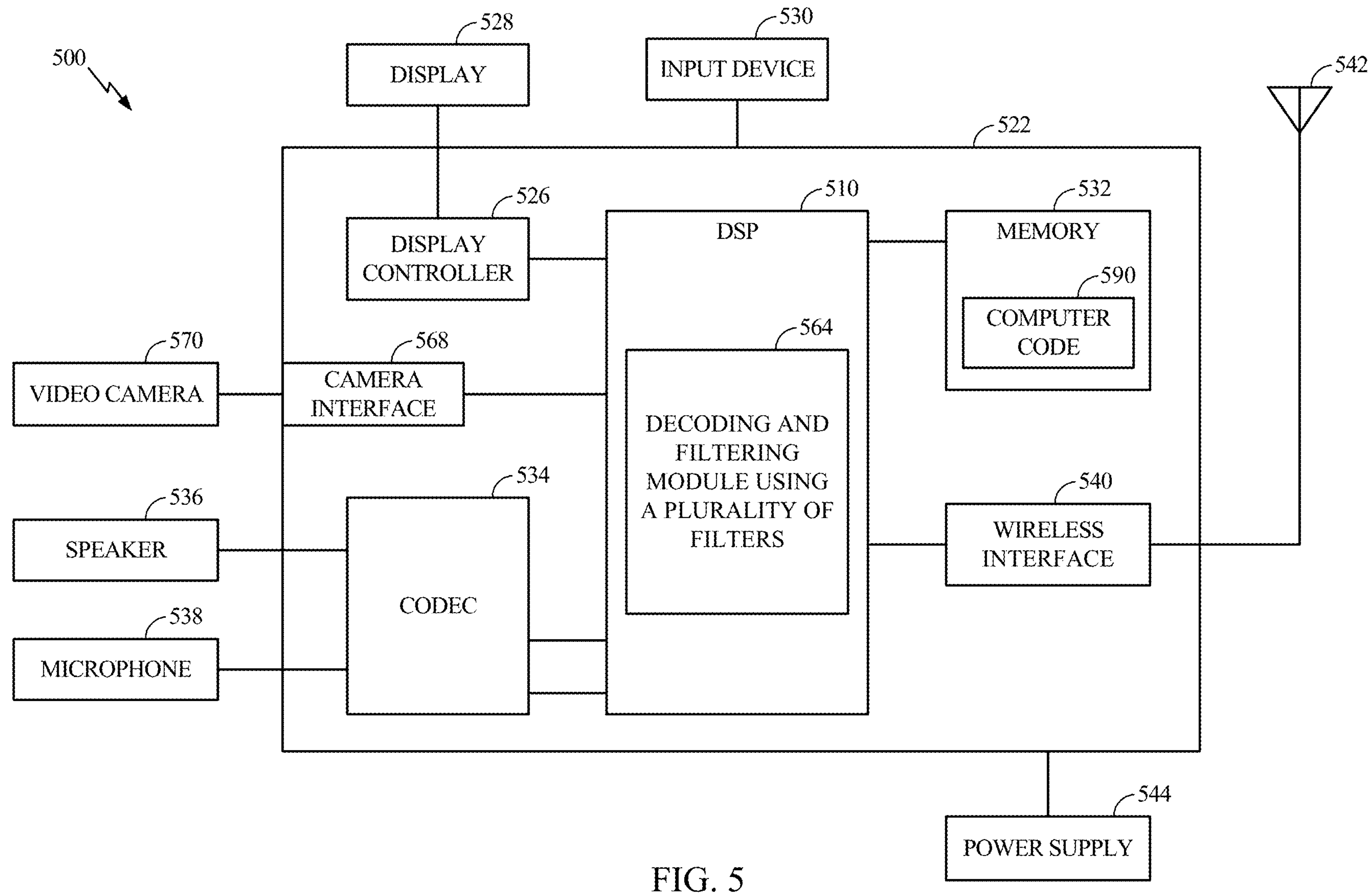
FIG. 5 is a block diagram of a particular embodiment of a portable communication device including a decoding and filtering module using a plurality of filters.

In a particular embodiment, the apparatus includes means for receiving the video data bitstream via a wireless transmission. The means for receiving the video data bitstream via a wireless transmission may include a wireless receiver, wireless receiving circuitry, a wireless transceiver, a portable communications device such as shown in FIG. 5 and described more fully below, corresponding hardware, software, firmware, or any combination thereof.

Figure 4:
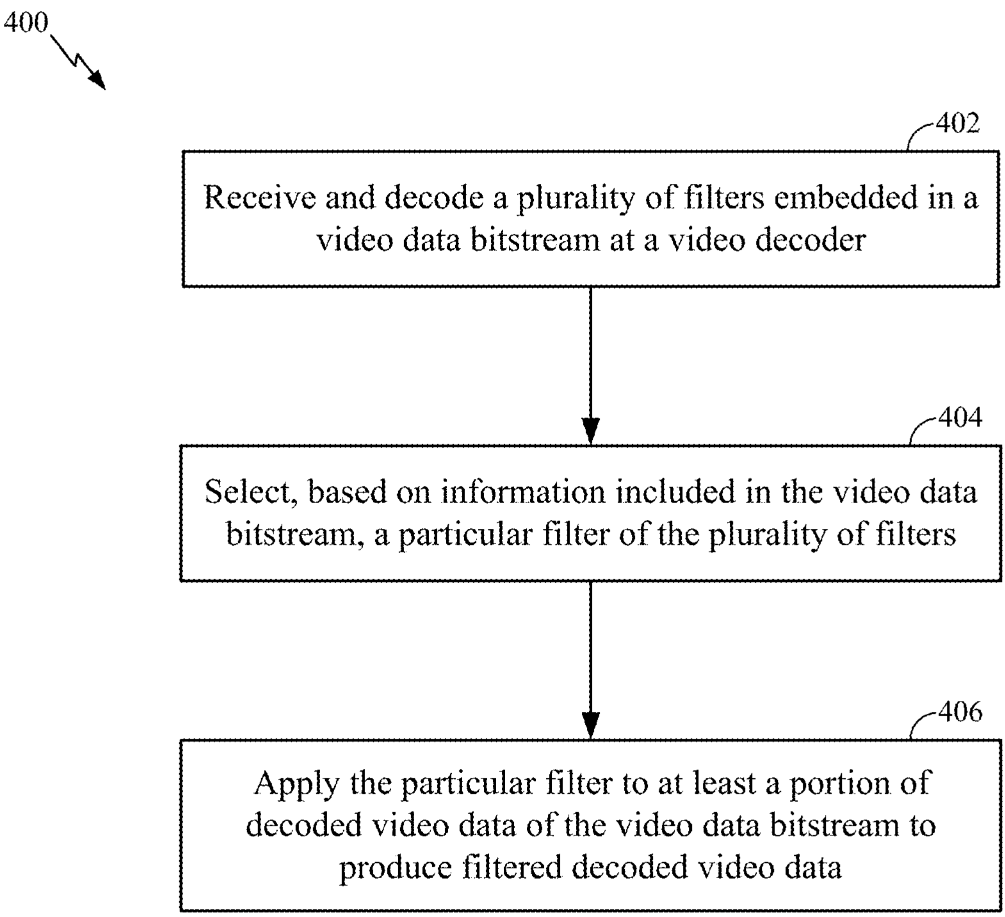
FIG. 4 is a flow diagram of a particular illustrative embodiment of a method to filter video data using a plurality of filters.

Referring to FIG. 4, a method 400 to filter video data using a plurality of filters is illustrated. The method 400 includes receiving and decoding a plurality of filters embedded in a video data bitstream at a video decoder, at 402. For example, the plurality of filters 204 of FIG. 2 may be embedded in a video data bitstream such as the video data bitstream 102 of FIG. 1. The plurality of filters 204 may be received and decoded at the video decoder 202 of FIG. 2.

The method 400 includes selecting, based on information included in the video data bitstream, a particular filter of the plurality of filters, at 404. For example, the processor 206 of FIG. 2 may select a particular filter of the plurality of filters 204, such as the first decoded filter 216, based on information included in the video data bitstream, such as the filter selection information 122 of FIG. 1 included in the video data bitstream 102.

The method 400 further includes applying the particular filter to at least a portion of decoded video data of the video data bitstream to produce filtered decoded video data, at 406. For example, the processor 206 of FIG. 2 may apply the decoded filter 216 to at least a portion of decoded video data, such as the particular frame 222, of the video data bitstream to produce filtered decoded video data, such as the filtered decoded video data 114 of FIG. 1.

FIG. 5 is a block diagram of particular embodiment of a system including a decoding and filtering module using a plurality of filters. The system 500 may be implemented in a portable electronic device and includes a processor 510, such as a digital signal processor (DSP), coupled to a memory 532. The system 500 includes a decoding and filtering module using a plurality of filters 564. In an illustrative example, the decoding and filtering module using a plurality of filters 564 includes any of the systems of FIGS. 1-3, operates in accordance with the method of FIG. 4, or any combination thereof. The decoding and filtering module using a plurality of filters 564 may be in the processor 510 or may be a separate device or circuitry along a hardware image processing pipeline (not shown), or a combination thereof.

A camera interface 568 is coupled to the processor 510 and also coupled to a camera, such as a video camera 570. The camera interface 568 may be responsive to the processor 510, such as for autofocusing and autoexposure control. A display controller 526 is coupled to the processor 510 and to a display device 528. A coder/decoder (CODEC) 534 can also be coupled to the processor 510. A speaker 536 and a microphone 538 can be coupled to the CODEC 534. A wireless interface 540 can be coupled to the processor 510 and to a wireless antenna 542.

The processor 510 may also be adapted to generate processed image data. The display controller 526 is configured to receive the processed image data and to provide the processed image data to the display device 528. In addition, the memory 532 may be configured to receive and to store the processed image data, and the wireless interface 540 may be configured to receive the processed image data for transmission via the antenna 542.

In a particular embodiment, the decoding and filtering module using a plurality of filters 564 is implemented as computer code that is running at the processor 510, such as computer executable instructions that are stored at a computer readable medium, illustrated as the computer code 590 stored at the memory 532. For example, the computer code 590 may include code for receiving and decoding a plurality of filters embedded in a video data bitstream at a video decoder, code for selecting, based on information included in the video data bitstream, a particular filter of the plurality of filters, and code for applying the particular filter to at least a portion of decoded video data of the video data bitstream to produce filtered decoded video data.

For example, the computer code 590 may also include code for determining frames for which each filter of the plurality of filters is to be applied, where the information included in the video data bitstream identifies frames corresponding to each filter by at least one of a frame number or a frame type. As another example, the computer code 590 may also include code for determining macroblocks for which each filter of the plurality of filters is to be applied, where the information included in the video data bitstream identifies macroblocks corresponding to each filter by at least one of a listing of macroblock types or a range of quantization parameter values used to reconstruct the macroblocks. Alternatively or in addition, the computer code 590 may include code for determining pixels for which each filter of the plurality of filters is to be applied based on a predetermined measure of local characteristics of an image. In a particular embodiment, a first filter of the plurality of filters may be applied to first pixels having a first value of the predetermined measure of local characteristics of the image in a first range of values and a second filter of the plurality of filters is applied to second pixels having a second value of the predetermined measure of local characteristics of the image in a second range of values.

In a particular embodiment, the processor 510, the display controller 526, the memory 532, the CODEC 534, the wireless interface 540, and the camera interface 568 are included in a system-in-package or system-on-chip device 522. In a particular embodiment, an input device 530 and a power supply 544 are coupled to the system-on-chip device 522. Moreover, in a particular embodiment, as illustrated in FIG. 5, the display device 528, the input device 530, the speaker 536, the microphone 538, the wireless antenna 542, the video camera 570, and the power supply 544 are external to the system-on-chip device 522. However, each of the display device 528, the input device 530, the speaker 536, the microphone 538, the wireless antenna 542, the video camera 570, and the power supply 544 can be coupled to a component of the system-on-chip device 522, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method of decoding video data, the method comprising:

receiving, from an encoded video bitstream, video data of a unit of pixels of at least one frame, filter selection information for the unit of pixels, and filter data embedded in the encoded video bitstream;

reconstructing pixel values of pixels of the unit of pixels of the at least one frame using one of intra-frame prediction or inter-frame prediction;

measuring a variance value of reconstructed pixel values for particular pixels of the unit of pixels, wherein the measured variance value is representative of a deviation of the reconstructed pixel values for the particular pixels of the unit of pixels from a mean value of the reconstructed pixel values for the particular pixels of the unit of pixels, wherein the measured variance value is one of a plurality of variance values that includes a first variance value within a first range of values defined by the filter selection information and a second variance value within a second range of values defined by the filter selection information, the first variance value being different from the second variance value;

determining, for the unit of pixels, a plurality of filter coefficients based on the filter data, the filter selection information, and the measured variance value, comprising determining, using the measured variance value, the plurality of filter coefficients based on the filter selection information received from the encoded video bitstream such that one plurality of filter coefficients is determined based on the measured variance value for the particular pixels of the unit of pixels being the first variance value within the first range of values defined by the filter selection information and a different plurality of filter coefficients is determined based on the measured variance value for the particular pixels of the unit of pixels being the second variance value within the second range of values defined by the filter selection information; and applying the plurality of filter coefficients to a first reconstructed pixel value of the unit of pixels.

2. The method of claim 1, wherein the unit of pixels comprises a macroblock.

3. An apparatus for decoding video data, the apparatus comprising:

a video decoding processor configured to receive, from an encoded video bitstream, video data of a unit of pixels of at least one frame, filter selection information for the unit of pixels, and filter data embedded in the encoded video bitstream; and a memory configured to store reconstructed pixel values of the unit of pixels;

wherein the video decoding processor is further configured to:

reconstruct pixel values of pixels of the unit of pixels of the at least one frame using one of intra-frame prediction or inter-frame prediction;

measure a variance value of reconstructed pixel values for particular pixels of the unit of pixels, wherein the measured variance value is determined to be representative of a deviation of the reconstructed pixel values for the particular pixels of the unit of pixels from a mean value of the reconstructed pixel values for the particular pixels of the unit of pixels, wherein the measured variance value is one of a plurality of variance values that includes a first variance value within a first range of values defined by the filter selection information and a second variance value within a second range of values defined by the filter selection information, the first variance value being different from the second variance value;

determine, for the unit of pixels, a plurality of filter coefficients based on the filter data, the filter selection information, and the measured variance value, the plurality of filter coefficients being determined using the measured variance value based on the filter selection information received from the encoded video bitstream such that one plurality of filter coefficients is determined based on the measured variance value for the particular pixels of the unit of pixels being the first variance value within the first range of values defined by the filter selection information and a different plurality of filter coefficients is determined based on the measured variance value for the particular pixels of the unit of pixels being the second variance value within the second range of values defined by the filter selection information; and apply the plurality of filter coefficients to a first reconstructed pixel value of the unit of pixels.

4. The apparatus of claim 3, wherein the unit of pixels comprises a macroblock.

5. The apparatus of claim 3, further comprising a display device configured to display filtered decoded video data including filtered decoded pixel values.

* * * * *